United States Patent [19]
Dye

[11] 3,831,446
[45] Aug. 27, 1974

[54] APPARATUS FOR MEASURING AVERAGE FLOW RATE

[75] Inventor: John F. Dye, Barrington, Ill.

[73] Assignee: The Kendall Company, Walpole, Mass.

[22] Filed: May 14, 1973

[21] Appl. No.: 360,213

[52] U.S. Cl. .............................. 73/194 R, 128/2 F
[51] Int. Cl. ............................................. G01f 1/00
[58] Field of Search ........... 73/194 R; 128/2 F, 275, 128/295

[56] References Cited
UNITED STATES PATENTS

| | | | |
|---|---|---|---|
| 3,345,980 | 10/1967 | Coanda | 128/2 F |
| 3,362,400 | 1/1968 | De Bella | 128/2 F |
| 3,499,327 | 3/1970 | Lane | 73/421 |

Primary Examiner—Richard C. Queisser
Assistant Examiner—John P. Beauchamp
Attorney, Agent, or Firm—Powell L. Sprunger

[57] ABSTRACT

A device for measuring a duration of a liquid discharge having a hollow receptacle. The receptacle has an inlet port adjacent its upper end to receive the liquid discharge, and a cup-shaped pan below the inlet port to receive the liquid passing through the inlet port. The pan has a bore extending through the pan at a lower portion thereof and has an upper edge to direct overflow from the pan into a lower part of the receptacle. The receptacle also has a chamber below the pan communicating with the pan bore to collect liquid from the pan passing through the bore and to measure the period of time of the liquid discharge as indicated by the height of liquid collected in the chamber. Means is provided to also determine the total volume of the liquid discharge, and the average flow rate of the discharge may be determined from the measured volume and the time period of the discharge.

21 Claims, 7 Drawing Figures

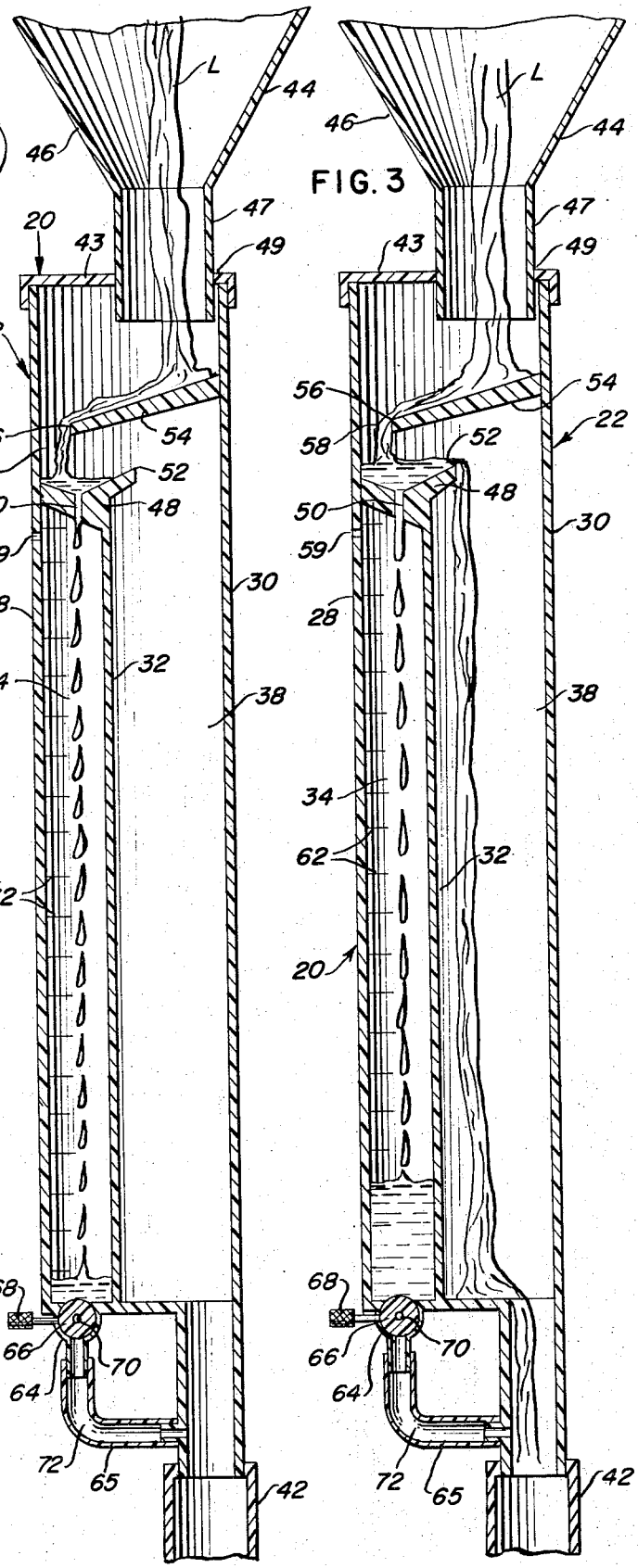

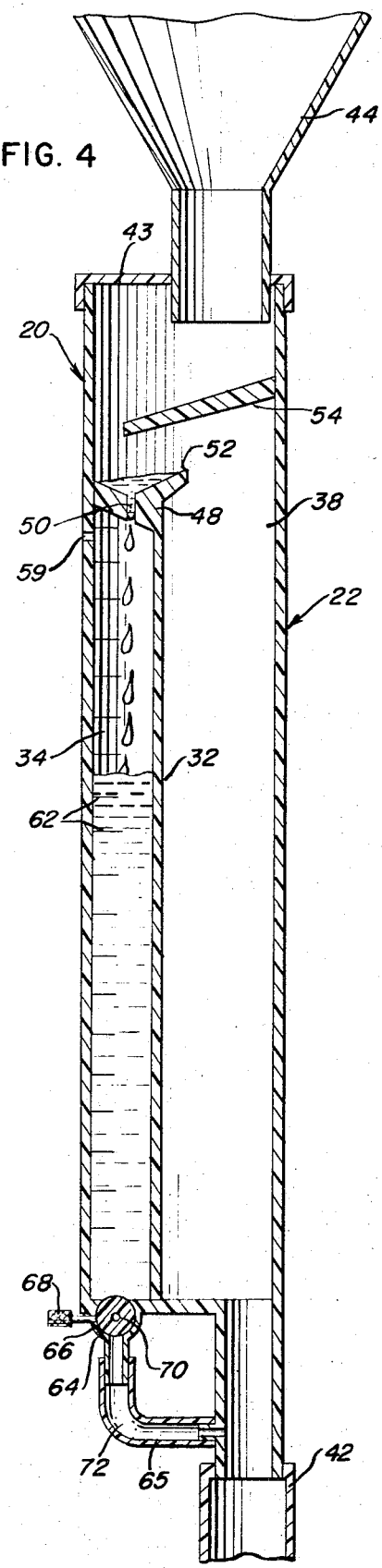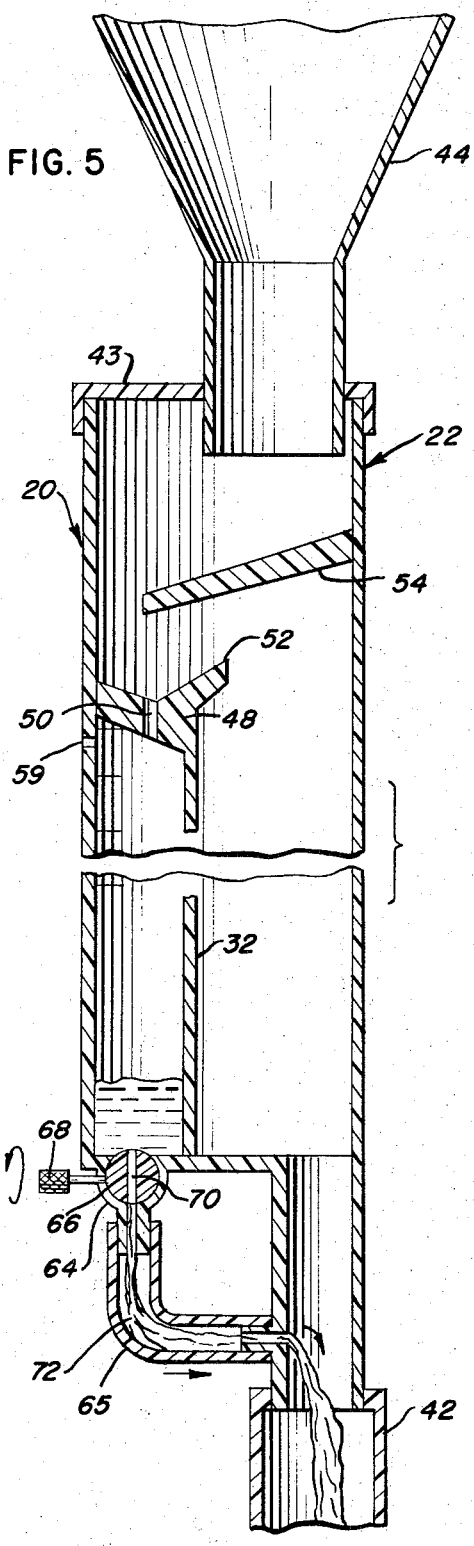

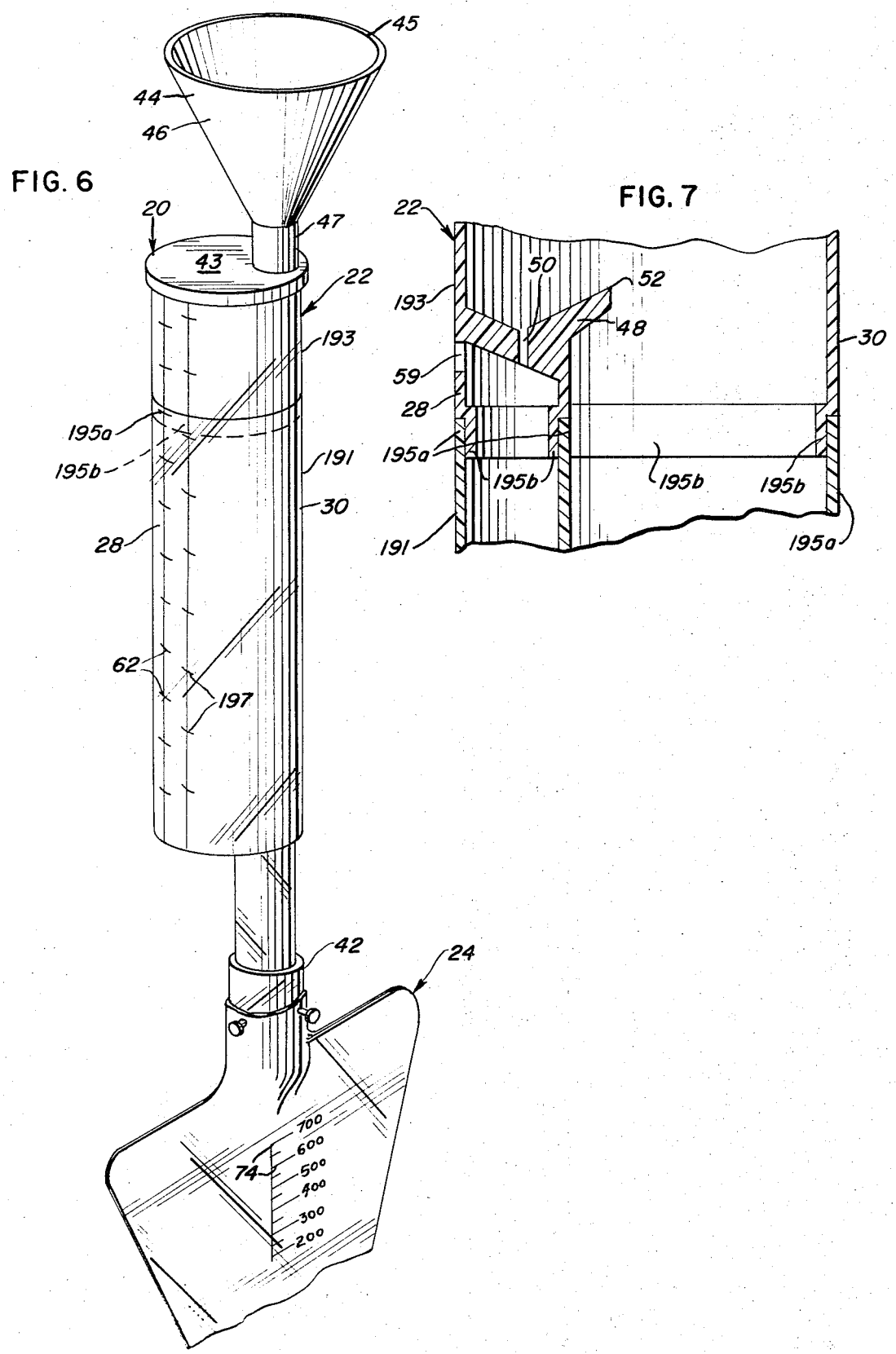

APPARATUS FOR MEASURING AVERAGE FLOW RATE

CROSS-REFERENCE TO RELATED APPLICATIONS

"Flow Measuring Device," Ser. No. 360,217, filed May 14, 1973, invented by Anthony J. Ciarico, and assigned to the assignee of the present application; "Flow Measuring Apparatus," Ser. No. 360,214, filed May 14, 1973, the present applicant being a co-inventor thereof, and assigned to the assignee of the present application; and "Apparatus for Measuring a Liquid Discharge," Ser. No. 360,218, filed May 14, 1973, invented by John F. Dye, William J. Binard, and Leonard R. Anglada, and assigned to the assignee of the present application.

BACKGROUND OF THE INVENTION

1. Field of the Invention.

This invention relates to liquid measuring apparatus, and more particularly to a device for measuring the duration of a liquid discharge.

2. Description of the Prior Art.

In the past, it has been found desirable to obtain various data pertaining to a liquid discharge. In particular, it was discovered that many urological problems could be readily diagnosed by analyzing information obtained during the natural voiding of urine by patients. Presently, various types of devices are utilized to obtain data on the urine stream, such as total volume, average flow rate, force, velocity, and configuration of the stream.

However, most of these devices have suffered from less than total reliability because they have required the presence of one or more observers while the patient is voiding. It is obvious that administration of such devices in this manner creates sufficient psychological difficulties for many of the patients to effect voiding. Consequently, if the patients void at all, the potentially erroneous data obtained may result in a false diagnosis and a loss of confidence in the device by the physician. A further complication arises from the fact that many of these devices are rather bulky, and somewhat difficult to use.

Lane, Jr. U.S. Pat. No. 3,499,327 discloses a device to divert the beginning and middle portions of the urine stream into separate chambers. Profy U.S. Pat. No. 3,561,427 relates to a device which collects urine in a plurality of rotating containers over a period of time. Coanda Re. 26,964 shows a container which measures the volume of urine over a period of time. De Bella U.S. Pat. No. 3,362,400 discloses a device for measuring specific gravity and the volume of liquid collected over a period of time. The related application "Apparatus for Measuring a Liquid Discharge" discloses a device for measuring the time duration of a liquid discharge, while the related applications "Flow Measuring Device" and "Flow Measuring Apparatus" disclose devices for measuring the peak flow rate of a liquid discharge.

SUMMARY OF THE INVENTION

The principle feature of the present invention is the provision of a device for measuring the time duration of a liquid discharge of simplified and compact construction, and which may be self-administered by a patient.

The time measuring device of the present invention comprises, a hollow receptacle having an inlet port adjacent its upper end to receive the liquid discharge, and a cup-shaped pan below the inlet port to receive the liquid passing through the inlet port. The pan has a bore extending through the pan at a lower portion thereof, and has an upper edge to direct overflow from the pan into a lower part of the receptacle. The receptacle also has a chamber below the pan and communicating with the pan bore to collect liquid from the pan passing through the bore.

A feature of the present invention is that the duration of time for the liquid discharge may be determined by the height of liquid collected in the chamber.

The time measuring device also has a container to receive the liquid which overflows from the pan. The device may include means for emptying the liquid collected in the chamber into the container.

Thus, a feature of the present invention is that the total volume of the liquid discharge may be determined by emptying the chamber into the container.

A further feature of the invention is that the average flow rate of the liquid discharge may be determined by the height of liquid collected in the chamber which indicates voiding time and the total volume of liquid collected in the container.

Further features will become more fully apparent in the following description of the embodiments of this invention and from the appended claims.

DESCRIPTION OF THE DRAWINGS

In the drawings:

FIG. 1 is a fragmentary perspective view, partly broken away, of the time measuring device of the present invention;

FIG. 2 is a fragmentary sectional view of the time measuring device of FIG. 1, during initiation of a liquid discharge into the device;

FIG. 3 is a fragmentary sectional view of the time measuring device of FIG. 1, at a later stage of voiding than that illustrated in FIG. 2;

FIG. 4 is a fragmentary sectional view of the time measuring device of FIG. 1, after completion of the discharge and during the terminal stages of collection of liquid in the device;

FIG. 5 is a fragmentary sectional view of the time measuring device of FIG. 1, showing valve means being opened to empty liquid from a chamber into a compartment in the receptacle;

FIG. 6 is a fragmentary perspective view of another embodiment of the time measuring device of the present invention; and FIG. 7 is a fragmentary sectional view of a receptacle in the time measuring apparatus of FIG. 6, showing the mating of upper and lower sections of the receptacle.

DESCRIPTION OF THE PREFERRED EMBODIMENTS

Referring now to FIGS. 1 and 2, there is shown a device, generally designated 20, for measuring the time duration of a liquid discharge. The device 20 includes a hollow receptacle designated generally 22 and a container designated generally 24 removably secured to the lower end of the receptacle. However, if desired, the container 24 may be made integral with the receptacle 22 at its lower end. Preferably, the receptacle and container are made from a suitable transparent material, such as plastic.

The receptacle has a front wall portion 28, a back wall portion 30, and an upright wall 32 in the receptacle which partially defines a chamber 34 intermediate the wall 32 and the front wall portion 28 and which partially defines a compartment 38 intermediate the upright wall 32 and the back wall portion 30. Preferably, the receptacle 22 includes a depending tubular extension 42 defining a lower portion of the compartment 38.

As illustrated in FIG. 1, the lower depending tubular extension 42 of the receptacle 22 has a plurality of outwardly projecting bosses 80, and the container 24 has a plurality of corresponding apertures 82 in an upper tubular portion 84 of the container 24. The depending tubular extension 42 is received in the tubular portion 84 of the container 24, and the bosses 80 are received in the apertures 82 to removably secure the container to the lower end of the receptacle.

A cup-shaped pan 48 covers the upper end of the chamber 34 adjacent the front wall portion 28, and the pan 48 has a bore 50 extending through the pan at a lower portion thereof and communicating with the chamber 34. The pan 48 also has an upper edge 52 adjacent the compartment 38. An inner baffle 54 extends downwardly from the back wall portion 30 above the compartment 38, and the baffle terminates at a lower edge 56 above the pan 48, such that the edge 56 defines an opening 58 between the edge 56 and the front wall portion 28.

A cap 43 is removably positioned on the upper end of the receptacle 22 to cover the receptacle. The receptacle 22 also has a funnel-shaped member 44 adjacent the upper end of the receptacle and defining an inlet port 45 to receive a liquid discharge. The funnel-shaped member 44 includes a tapered portion 46 and a lower depending portion 47 to direct the liquid discharge into the inside of the receptacle. The cap 43 has an aperture 49 to removably receive the lower depending portion 47 of the funnel-shaped member 44, such that the depending portion 47 is located above the baffle 54.

In operation, the receptacle is positioned to receive a discharge of liquid L, such as a urine stream during voiding, through the inlet port 45, and the functioning of the receptacle during the initial stage of the liquid discharge L is illustrated in FIG. 2. As the liquid discharge L passes into the receptacle through the inlet port 45, the tapered portion 46 and depending portion 47 direct the discharge L toward the rearward part of the receptacle and against the baffle 54. The baffle 54 breaks the discharge by reducing the force and velocity of the stream to prevent turbulence in the rest of the receptacle, and it directs the discharge over the lower edge 56 of the baffle 54 into the pan 48 in a lower part of the receptacle. A portion of the liquid which collects in the cup-shaped pan 48 then begins to pass through the bore 50 into the chamber 34 for collection in the lower part of the chamber. Preferably, the pan 48 is relatively shallow, and the liquid will pass through the bore 50 at a fairly constant rate, since the height of liquid collected in the pan does not vary to an appreciable extent. Passage of liquid into the chamber 34 is facilitated by an opening 59 adjacent the upper end of the chamber and communicating between the chamber and the atmosphere to vent the chamber.

Because the liquid discharge into the pan 48 collects faster than it passes through the bore 50, the level of liquid in the pan quickly builds up and overflows over the upper edge 52 of the pan into the compartment 38, as shown in FIG. 3. Preferably, the diameter of the bore 50 of the pan 48 is relatively small, and overflow of the pan will occur shortly after initiation of the liquid discharge. After the pan 48 overflows, the liquid simultaneously passes through the bore 50 into the chamber 34 and also into the compartment 38. The liquid which overflows from the pan into the compartment then passes through the tubular extension 42 into the container 24 for collection.

The overflow of liquid from the pan 48 into the compartment 38 continues throughout the liquid discharge, but once the discharge stops the overflow of liquid from the pan soon discontinues, and the remainder of the liquid in the pan drains through the bore 50 into the chamber 34, as shown in FIG. 4. However, during the period of time in which the liquid overflows from the pan 48 into the compartment 38, the pan retains a head of liquid of fixed height. Accordingly, the head of fixed height in the pan exerts a constant pressure on liquid passing through the bore 50 and the liquid thus passes from the pan 48 into the chamber 34 at a uniform rate. Consequently, an increase in the rate of flow of liquid discharge into the receptacle results in a corresponding increase in the rate of overflow of liquid from the pan 48 into the compartment 38, and does not affect the rate of flow of liquid through the pan bore 50 which remains uniform. Due to the relatively small flow capacity of the bore 50, the overflow condition of the pan may continue until the discharge into the receptacle has terminated, as illustrated in FIG. 4. Although the discharge no longer passes into the pan 48 and overflows from the pan into the compartment 38, the liquid continues to drain from the pan through the bore 50 into the chamber 34 until the pan itself is empty.

After the discharge has been completed and the pan has drained, the total time period taken for the liquid discharge may be determined by the height of liquid collected in the chamber 34. This follows since the rate of liquid flow into the chamber 34 has been nearly constant during the total period of voiding. As discussed above, in the time period during which the pan overflows into the compartment 38, a head of liquid of constant height has been maintained in the pan to exert a constant pressure on the liquid flowing from the pan through the bore 50, resulting in a uniform flow rate of liquid into the chamber 34 during this period. During initiation of the liquid discharge, the head of liquid in the pan 48 rises from a zero level to its constant level during overflow of the pan into the compartment 38. However, due to the shallowness of the pan and small size of the bore 50, this buildup of the liquid head occurs in a relatively short period of time, and the rate of flow into the chamber 34 is nearly constant. When the liquid discontinues overflowing into the compartment 38 at the termination of the discharge, a fixed volume of liquid drains into the chamber 34 and is compensated for in the calibration of the chamber 34, described below.

Thus, since the flow rate of liquid from the pan into the chamber 34 has been nearly constant throughout the liquid discharge, the period of time for the total discharge may readily be determined by the height of the liquid collected in the chamber 34. Accordingly, the receptacle is calibrated by indicia 62, such as in seconds, as shown in FIG. 2, to determine the time period for the liquid discharge, and the height of liquid collected in the chamber 34 is utilized to take a reading of time from the indicia 62. It is apparent that calibration of the chamber is facilitated if the chamber has a uniform cross sectional area from the bottom of the chamber to slightly below the bottom of the pan, since the indicia 62 will have a linear relationship in this case.

The receptacle 22 also includes means for emptying the chamber 34 into the lower end of the compartment 38 and container 24. The emptying means may comprise valve means 64 adjacent the lower end of the chamber 34 for selectively opening and closing the chamber, and an exit tube 65 communicating between the valve means 64 and the compartment 38. Any suitable valve may be utilized for the valve means 64. However, in one embodiment of the invention, the valve means may have a spherical valve portion 66, as shown in FIG. 1, with a handle 68 extending from the spherical portion 66 for turning the spherical portion. A passageway 70 extends centrally through the spherical portion 66, and communicates between the chamber 34 and a lumen 72 in the exit tube 65 in the open position of the valve means, as shown in FIG. 1. To close the valve means 64 and the chamber 34, the handle 68 is turned, as indicated by the direction of the arrow shown in FIG. 1, into a position at which the central passageway 70 no longer communicates with the chamber 34 or lumen 72, as shown in FIG. 2.

After a reading of time has been taken from the indicia 62, the valve means 64 is opened, as shown in FIG. 5, and liquid drains from the chamber 34, through the central passageway 70 of the valve means, the lumen 72 of the exit tube 65, the lower end of the compartment 38, and into the container 24, as indicated by the direction of the arrows in the drawings. The chamber 34 is vented to the atmosphere through the opening 59 and the bore 50 to facilitate drainage of the chamber.

After drainage of the liquid from the chamber 34 into the container 24, the container retains the total volume of the liquid discharge. Accordingly, the total volume of the liquid discharge may be determined by graduated indicia 74 on the container 24, as shown in FIG. 1. Also, since the total volume of the liquid discharge may be determined by the indicia 74, and the time period for the liquid discharge has already been determined by the indicia 62, the average flow rate of the liquid discharge may readily be determined by simply dividing the value for the total volume of the liquid discharge by the value for the time period of the liquid discharge previously determined.

In use of the device 20 by a patient, the valve means 64 is first closed and the device is given to the patient for voiding. Since the patient may use the device without observation, unnatural voiding or failure to void which normally occur from psychological difficulties when a patient voids under observation are prevented. After voiding, the patient merely summons the physician or nurse, who first determines the total time period of the liquid discharge. The valve means 64 is then opened to empty the chamber 34 into the container 24, and the total volume of the liquid discharge is next determined. Finally, the average flow rate of the liquid discharge may be determined from the total volume and time period of the discharge, as previously described, and the container 24 may be removed from the receptacle 22 to obtain a sample of the urine, if desired.

Another embodiment of the invention is illustrated in FIGS. 6 and 7, which is similar to the time measuring device previously described in connection with FIGS. 1–5, except that the valve means is eliminated in this embodiment, and alternative means is provided for emptying the chamber. As shown in FIG. 6, the device 20 includes a receptacle 22, and a container or collection bag 24.

As illustrated in FIGS. 6 and 7, the receptacle 22 has a lower section 191 and an upper section 193 which is releasably secured to the lower section 191. The upper end of the lower section 191 and the lower end of the upper section 193 have mating flanges 195a and 195b, respectively, to releasably interlock the two sections together. The flange 195b of the upper section 193 is recessed in the chamber 34 and around the periphery of the receptacle outer wall, such that the flange 195b is received in the upper end of the lower section 191 and is mated with the flange 195a.

When the liquid discharge has been completed, the chamber 34 may be emptied by removing the upper section 193 from the lower section 191, thus exposing the liquid which has collected in the chamber 34. Once the liquid has been removed from the chamber 34, the sections 191 and 193 may be secured to each other for further use of the receptacle 22, is desired.

Since the liquid which has collected in the chamber 34 does not pass to the container 24 in this embodiment of the invention, the receptacle may be provided with additional indicia 197, as shown in FIG. 6, to indicate the volume of liquid collected in the chamber. Thus, the total volume of the liquid discharge may be determined by adding the volume collected in the chamber 34 and the container 24, as indicated by the respective indicia of the receptacle and container.

The foregoing detailed description is given for clearness of understanding only, and no unnecessary limitations should be understood therefrom, as modifications will be obvious to those skilled in the art.

I claim:

1. A device for measuring the duration of a liquid discharge comprising; a hollow receptacle having an inlet port adjacent the upper end of the receptacle to receive the liquid discharge, a cup-shaped pan below the inlet port to receive the liquid passing through the inlet port, said pan having a bore extending through the pan at a lower portion thereof and an upper edge to direct overflow from the pan into a lower part of the receptacle, and said receptacle having a chamber below said pan and communicating with the pan bore to collect liquid from the pan passing through the bore and measure the period of time of the liquid discharge as indicated by the height of liquid collected in the chamber.

2. The measuring device of claim 1 including means for directing the liquid discharge into the pan.

3. The measuring device of claim 2 wherein said directing means comprises an inner baffle below the inlet port and above the pan to break the liquid discharge, with said baffle having a lower edge for directing the liquid into the pan.

4. The measuring device of claim 3 wherein said receptacle includes a tapered portion adjacent the upper end of the receptacle to direct the liquid discharge against the baffle.

5. The measuring device of claim 4 wherein said tapered portion directs the liquid to a rearward portion of the receptacle, said pan extends from a front wall of the receptacle, said baffle extends downwardly from a rear wall of the receptacle toward the front wall, and said baffle edge defines an opening between the baffle edge and the front wall above the pan.

6. The measuring device of claim 1 including means for emptying collected liquid from said chamber.

7. The measuring device of claim 6 including means for venting said chamber to facilitate emptying of the chamber.

8. The measuring device of claim 6 wherein said receptacle includes a compartment below the upper edge of the pan to receive the overflow of liquid from the pan, and said emptying means comprises, valve means adjacent the lower end of the chamber for selectively opening and closing the chamber, and an exit tube communicating between the valve means and said compartment for passing liquid from the opened valve means to the compartment.

9. The measuring device of claim 8 wherein said receptacle includes a depending tubular extension defining a lower portion of the compartment and said exit tube communicates with the compartment in said tubular extension.

10. The measuring apparatus of claim 6 wherein the emptying means comprises upper and lower sections of said receptacle, said upper and lower sections being releasably secured to each other adjacent the upper end of the chamber and below the pan, whereby the upper section may be removed from the lower section for access to the liquid collected in said chamber.

11. The measuring apparatus of claim 10 wherein the upper end of said lower section and the lower end of the upper section have mating flanges to releasably secure the lower and upper sections together.

12. The measuring device of claim 1 wherein said receptacle includes an upright wall partially defining said chamber and a compartment below the upper edge of the pan.

13. The measuring device of claim 12 including a container below the receptacle communicating with the compartment for passage of liquid from the compartment to the container and collection therein.

14. The measuring device of claim 13 including means for selectively emptying the collected liquid in said chamber into the container.

15. The measuring device of claim 13 including indicia on said container indicating the volume of liquid collected in the container.

16. The measuring device of claim 1 including indicia on the receptacle indicating the period of time for the liquid discharge by the height of liquid collected in the chamber.

17. The measuring device of claim 1 wherein said chamber has a substantially uniform cross sectional area from the bottom of the chamber to slightly below the bottom of said pan.

18. The measuring device of claim 1 wherein said receptacle includes a generally funnel-shaped member adjacent the upper end of the receptacle and defining said inlet port for directing the liquid discharge into the receptacle.

19. The measuring device of claim 17 wherein said receptacle includes a cap adjacent its upper end for covering the receptacle, said cap having an aperture for removably receiving said funnel-shaped member.

20. The measuring device of claim 1 including means for venting said chamber to facilitate passage of liquid from the pan into the chamber.

21. The measuring device of claim 1 including indicia on the receptacle indicating the volume of liquid collected in the chamber.

* * * * *